Patented May 13, 1930

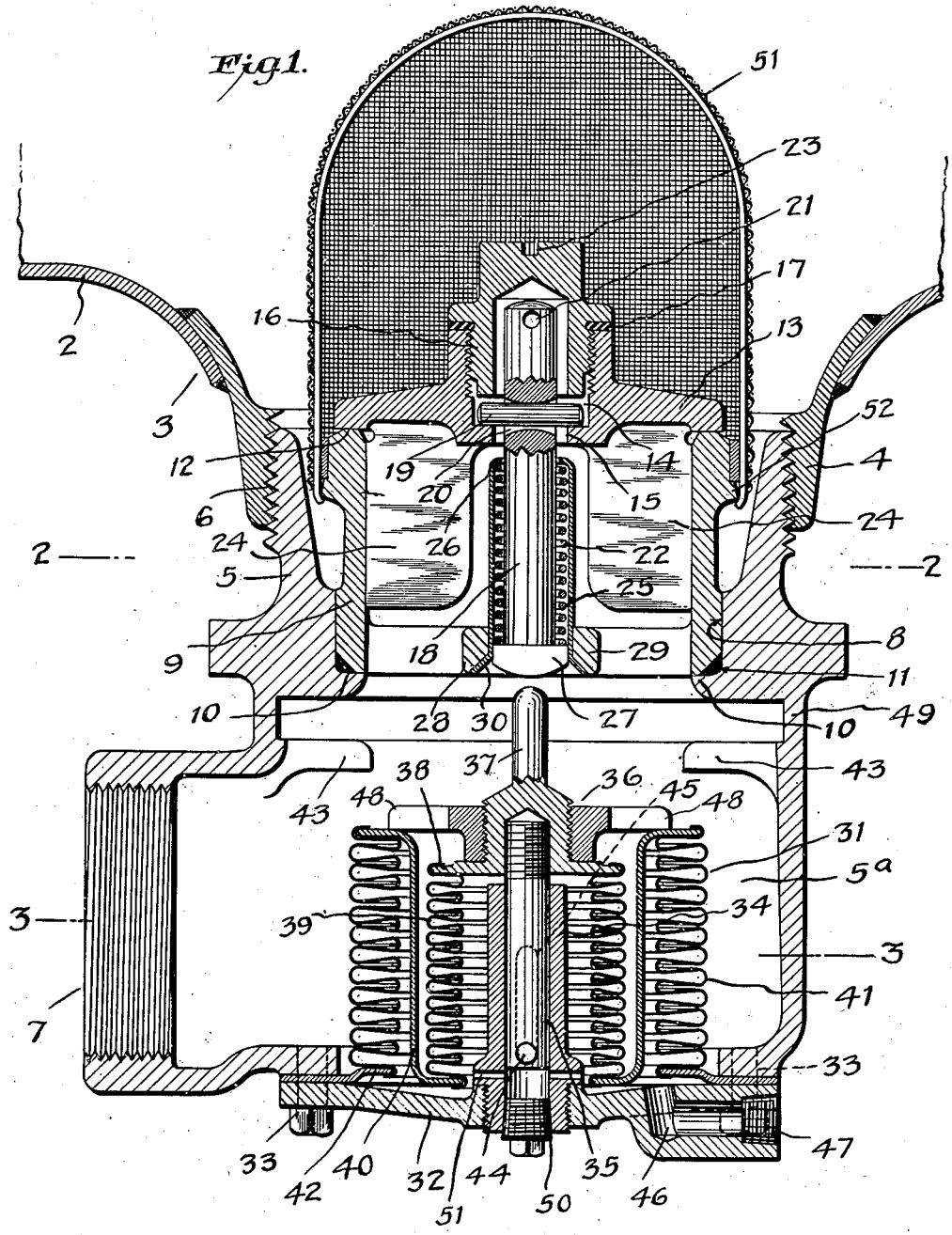

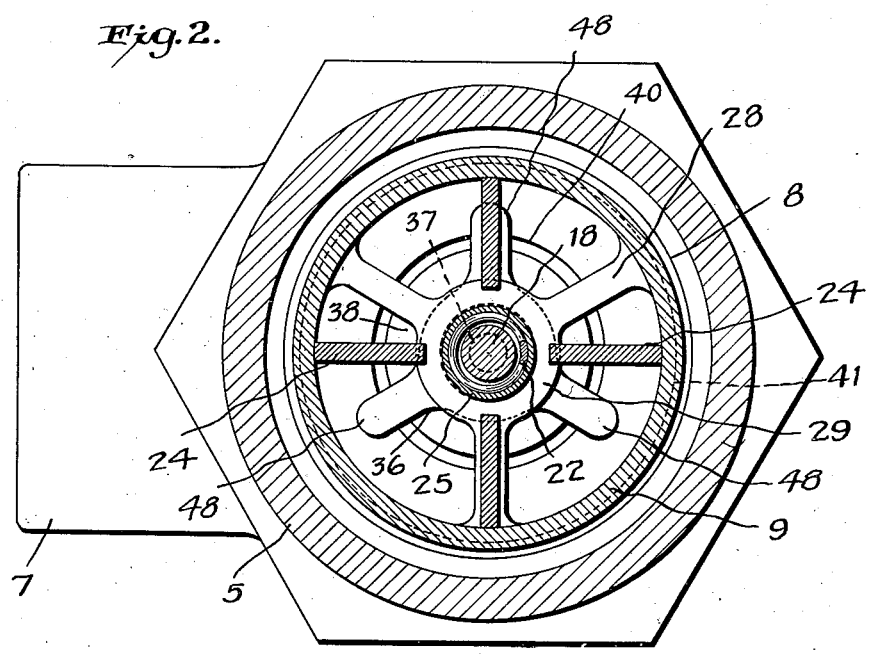
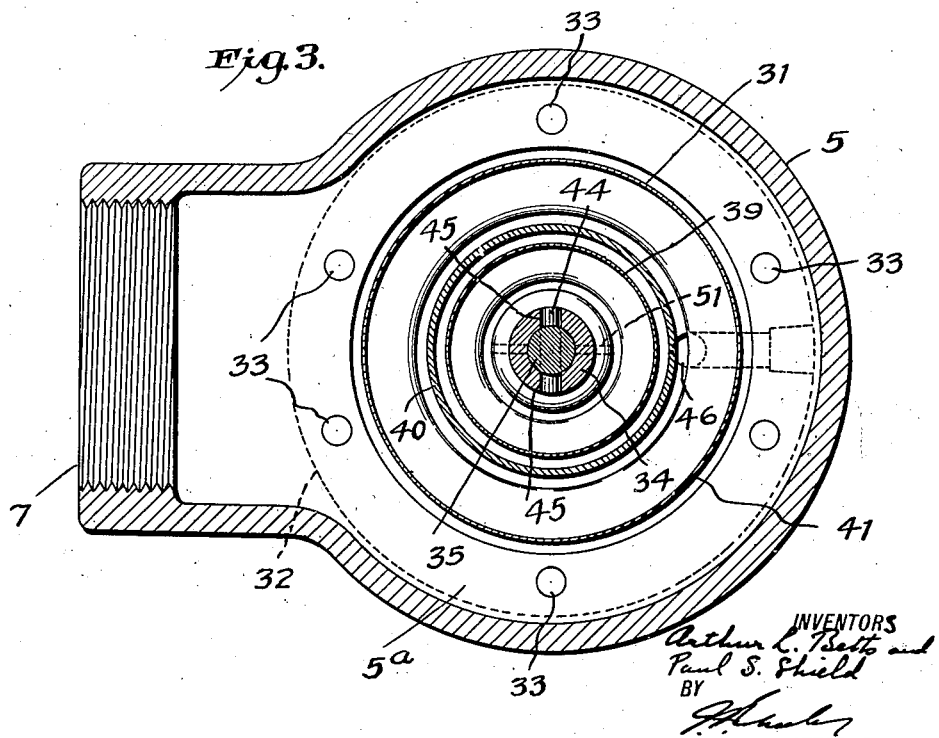

1,758,644

UNITED STATES PATENT OFFICE

ARTHUR L. BETTS AND PAUL S. SHIELD, OF CINCINNATI, OHIO, ASSIGNORS TO AUGUSTINE DAVIS, JR., OF CINCINNATI, OHIO

TANK VALVE

Application filed September 3, 1926. Serial No. 133,324.

The invention relates to tank outlet valves, such as the safety or "emergency" valves of oil truck tanks the function of which is to keep the contents of the tank from being discharged through the delivery piping in event of injury to the piping or faucets, and the improvements relate more particularly to fluid-operated valves. The general object is to provide a very efficient, safe and reliable non-leaking valve, and likewise a self-contained valve structure with operating means incorporated therein, which are suitable and advantageous for the purpose indicated, adapted for economical manufacture, especially compact in construction and internal relations, and particularly well adapted for access and servicing. An object is, also, to safeguard the valve and tank in an important manner, so as to prevent discharge of the inflammable contents in case of accident. The invention comprises matters of construction, organization and operation and certain combinations and parts or subcombinations, which will be described hereinafter and more particularly pointed out in the claims.

The accompanying drawings illustrate the preferred embodiment of the invention:

Fig. 1 is a central vertical sectional view of the valve and a portion of the tank;

Fig. 2 is a horizontal section on the line 2—2 of Fig. 1; and

Fig. 3 is a horizontal section on the line 3—3 of Fig. 1.

The numeral 2 designates the bottom sheet of a tank, having a downwardly flanged outlet opening 3, into which is welded a screw-threaded outlet collar 4.

The valve body 5 has screw-threads 6 upon its upper cylindrical portion so that it may be screwed into and removed from this collar from below, that is to say, from the outside of the tank.

The lower part of this body has a lateral outlet connection 7 to receive the delivery pipe; and the interior of this part of the body is utilized as a mechanism chamber for the means hereinafter described for opening the valve.

The upper part of the valve body is formed with an internal cylindrical surface 8, into which is tightly driven a wide annular member 9, preferably of a material such as bronze. The lower end of this member is driven down to a shoulder 10, and impervious material is confined in a recess 11 substantially as in the application of Paul S. Shield, Serial No. 708,850, filed April 25, 1924. As in that application the region 8 where the annular member 9 is held is offset below the zone of possible distortion which includes the screw joint between the body and said member, and from this region the member rises free from the body, carrying the valve seat 12 on the top of its free portion. As was explained in that application, it was discovered that frequently the reason why such valves tended to leak was not due to any imperfection in the valve itself, but to distortion of the outlet collar resulting from the welding operation, which distortion would distort the valve body, when it was screwed in, sufficiently to impair the tight seating of the valve member against the large internal diameter valve seat of these valves. The advantage of a valve seat which may be made of special material and which is unaffected by any distortion of the valve body due to its securement in the tank outlet is preserved in the present construction; but the valve seat instead of being sunk below the zone of the screw joint, as illustrated in the Shield application, is considerably elevated on the free portion of the annular member, which extends upward within the said zone, though free from it, so that the valve seat may be substantially at the top of the body without suffering from the effect of distortion in the body. This allows ample room below the valve seat and the valve disk or member 13, both for the operating means for raising and unseating the valve and for the spring means for seating the same, leaving no mechanism within the tank above the valve and valve seat, and requiring no increase over ordinary moderate depth of body below the tank.

The valve member 13 is a disk having an accurately formed flat under surface to bear tight against the accurately formed narrow annular valve seat. The valve disk has a central opening 14 through it, this opening having a shoulder or reduction 15 at the bottom. The opening is screw-threaded to receive a removable plug or closure member 16, which is screwed in from above, a gasket 17 being provided to insure a tight joint.

A depending valve-stem 18 has its upper portion loosely received in the recess formed between the valve disk and its top member 16, and within the hollow interior of the latter. A removable cross-pin 19 passed through a transverse hole 20 in the upper part of the stem, with its ends in the recess of the valve member and confined between the plug 16 and the shoulder 15, provides a simple, disconnectible universal articulation. For this purpose the hole 20 is flared in both directions from the middle, so that the stem may have rocking movement lengthwise of the pin, in addition to the pivotal movement transversely of the pin.

The ends of the pin are opposed by the sides of the recess, so that the pin can not come out as long as the pin is in the recess. The upper end of the stem, however, is provided with a hole 21 whereby, when the plug 16 is removed, the valve stem can be hooked and pulled up against the tension of spring 22 sufficiently to enable the pin to be slipped out. The valve disk is then free and can be taken out for grinding or replacement. In this connection, it will be noted that a kerf 23 is provided in the top of the plug. After removal, the plug is screwed back into the disk, and the plug with its kerf will then serve as a means of engagement for a screw-driver or other tool for the purpose of the valve-grinding operation. The replacement of the valve member is accomplished in a like simple manner.

The valve disk is guided and centered by wings 24 on its under side, the outer vertical edges of these wings cooperating with the cylindrical inner surface of the annular member 9. A space is left at the center, inside of these wings for the valve stem 18, the coil spring 22, and an upstanding sleeve 25 which surrounds the spring and stem, and the upper end 26 of which is turned in to form an abutment, the spring being confined under compression between this abutment and a shouldered head 27 on the lower end of the stem so as to draw the valve down against its seat.

The abutment member 25 is supported from the same annular member that carries the valve seat, that is to say it is supported in the upper part of the body. For this purpose the lower end of the member 9 is formed or provided with a spider 28, the sleeve 25 being inserted upward with a drive fit in the hub 29 of the spider, where it is reliably held against loosening under the action of the spring by means of a flange 30.

The valve is opened by a fluid-pressure operated metal bellows device 31 of the kind known as a sylphon. These devices are very advantageous for the purpose, but they are obtainable in comparatively short lengths and have a limited amount of extension. For this reason, it has been thought necessary when using them in a tank valve, which must be opened widely, to employ two of them in tandem, a construction necessitating a good deal of vertical space. According to the present invention two, or a plurality of, sylphons are connected telescopically, one within the other, and are accommodated in the comparatively low chamber 5$^a$ of the lower part of the body, which is entirely outside the tank, the valve raising means thus being below the spring means for seating the valve, and both being below the valve member and valve seat.

The invention also provides for the mounting of the fluid-operated valve-lifting means on a removable bottom member, forming a unit which can be conveniently removed and shipped for servicing and repair. To this end, the lower part of the valve body is provided with a bottom plate 32, which is detachably screwed or bolted to the bottom of the body at 33, and the telescopic bellows device is carried by this plate, so that when the plate is detached the whole device is taken out through the open bottom of the body, remaining attached to the plate, and is replaceable in like manner by a fresh plate and bellows device. The special preferred construction of these parts will now be described.

The plate 32 has a central screw-threaded opening, into which is screwed the lower end of an upstanding tubular guide 34. In this guide slides a stem 35, on the upper end of which is a thrust head 36 having a projecting finger 37, which is separate from the valve stem 18 but adapted to contact with the lower end thereof when the bellows device is expanded, so as to lift the valve against the action of the spring 22.

A flange 38 of said head is tightly engaged by the upper end of the inner section 39 of the bellows device. The lower end of said device is connected to the inturned lower flange of a connecting shell 40; and the upper end of this connecting member is engaged by the upper end of the outer section 41 of the compound bellows. The lower end of said outer section engages a ring 42, or extension, which is clamped between the bottom of the body and the plate 32.

Injury to the outer bellows 41 by overextension is prevented in a simple and advantageous manner by casting the body with stop lugs 43, which overhang the top flange of the connecting shell 40 at a suitable distance above the normal, contracted height of the outer section. Over extension of the inner section is prevented by stop means between the guide 34 and the stem 35, this stop means preferably consisting of a cross-pin 44 carried by the stem, its ends working in vertical slots 45 in the guide, the upper ends of these slots determining the height to which said inner section may rise.

The bottom-plate is formed with a passage 46 through which the fluid pressure from a suitable source is admitted and permitted to escape, this passage having a connection 47 for the control line. The inner end of the passage opens into the space above the plate within the bellows device. When the pressure is applied, the outer bellows 41, being of larger diameter, is expanded first, and raises the thrust head 36 by contact of the top of the connecting shell 40 with wings 48 on said head overlying the upper flange of the shell. The inner bellows 39 is also raised bodily by the connecting member, and, when the outer bellows comes to its stop, the pressure then expands the inner bellows, raising the head 36 above the outer bellows and continuing the valve-raising movement, until the inner bellows is stopped in its turn.

It will be seen that the valve member, its seat, and the spring means for closing the valve with its spring abutment, are all carried by the upper part of the body, which is firmly secured to the outlet of the tank, while the separate valve opening means is entirely carried by the lower part of the body. Furthermore, the body is intentionally provided with a comparatively weak section 49 intermediate these parts, the valve and valve-closing means being supported by the portion of the body above this section, while the bellows device is carried by the portion of the body below said section. In this way an important protection is obtained, since in case of a collision or other serious accident to the tank vehicle which would be likely to tear away piping and connections, the body, if it breaks at all, will give way at the weakened section, leaving the valve, valve seat and valve-closing means intact and tightly closed. The valve-opening means, however, would be carried away with the lower part of the body, causing the valve to close instantly if it should be open at the time, or, if the valve had been closed, absolutely preventing any accidental or unwise operation of the control system resulting in opening of the valve after such an accident.

The lower end of the tubular guide 34 is internally screw-threaded, and receives a removable screw plug 50. Removal of this plug enables the bellows device to be drained through a passage 51 in the guide near its lower end, and also enables the valve to be raised by the insertion of a stick in case the fluid-pressure means should fail to work for any reason. Likewise, by inserting a piece of proper length in the lower end of the tube and replacing the plug, the valve can be chocked open if that should be necessary.

The fact that all mechanism is below the valve and valve seat, and that there is no high projection in the tank above the valve seat, makes it possible to provide a screen 51 covering the top and sides of the valve seat and valve member, to prevent foreign material reaching these parts and injuring the seating surfaces or by lodging between them keeping the valve from closing tight. This screen is advantageously carried by the annular valve seat member 9, this member being provided on the outside, near the top, with a circumferential rib 52 over which the bottom of the screen is clipped.

While the preferred and now best known form of the invention has been described in detail, it will be understood that the invention is not limited to the precise construction, that there may be various changes, additions and omissions within the scope of the claims, and that certain features may be used without others. While the valve is preferably and most advantageously operated by fluid-pressure means, and is specially designed to that end, the invention is not necessarily limited in all aspects to the type of operating mechanism.

We claim:

1. In a tank having a bottom outlet, a valve for closing said outlet comprising a body applied thereto and comprising a portion which is secured to said outlet and a lower portion which affords an external pipe connection, the body being formed intermediate said portions with a relatively weak section adapted to break in case of an accident likely to tear away the piping, a downwardly seating valve member, an internal annulus which is carried by the valve body at a region which is offset from the zone of possible distortion resulting from the securement of the valve body to the tank outlet and which is above said relatively weak section, the annulus rising from said region free from the wall of the body and carrying the seat for said valve member on its free portion, spring means for closing the valve upon the seat likewise carried by the portion of the valve body which is above said weak section, and means in the lower portion of the body for raising the valve member to open the outlet, said means being unconnected with the valve member.

2. In a tank having a bottom outlet, a valve for closing said outlet comprising a body applied thereto and comprising a portion which is secured to said outlet and a lower portion which affords an external pipe connection, the body being formed intermediate said portions with a relatively weak section adapted to break in case of an accident likely to tear away the piping, a downwardly seating valve member, an internal annulus which is carried by the valve body at a region which is offset from the zone of possible distortion resulting from the securement of the valve body to the tank outlet and which is above said relatively weak section, the annulus rising from said region free from the wall of the body and carrying the seat for said valve member on its free portion, spring means beneath the valve member for drawing the same down upon the seat, said spring means being carried by the portion of the valve body which is above said weak section, and means in the lower portion of the body below said weak section for raising the valve member to open the outlet, said means being unconnected with the valve member.

3. In a tank having a bottom outlet, a valve for closing said outlet comprising a body applied thereto and comprising a portion which is secured to said outlet and a lower portion which affords an external pipe connection, the body being formed intermediate said portions with a relatively weak section adapted to break in case of an accident likely to tear away the piping, a downwardly seating valve member, an internal annulus which is carried by the valve body at a region which is offset from the zone of possible distortion resulting from the securement of the valve body to the tank outlet and which is above said relatively weak section, the annulus rising from said region free from the wall of the body and carrying the seat for said valve member on its free portion, spring means beneath the valve member for drawing the same down upon the seat, said spring means being carried by the portion of the valve body which is above said weak section, and means in the lower portion of the body below said weak section for raising the valve member to open the outlet, said means comprising a telescopic bellows device operable by fluid pressure and consisting of a plurality of sections one within the other.

4. In a tank having a screw-threaded bottom outlet collar, a valve for closing said outlet comprising a body having a portion of its wall threaded so as to be screwed upward into said collar, the lower portion of the body affording an external pipe connection and containing a mechanism chamber, a separate annulus inserted into said body, said annulus having a lower portion which is fixed in the upper portion of the body at a region below the zone of the screw joint, the annulus thence rising upward within said zone but free from the influence of possible distortion arising therein and carrying a valve seat considerably elevated above said mechanism chamber, a downwardly seating valve member cooperating with said seat, a valve stem depending from said valve member, a spring for closing said valve member cooperating with said stem below the valve member, and means in said chamber and below the valve member and valve stem for raising the same to open the outlet, said means being separate from the valve stem against which it is to act.

5. In a tank having a screw-threaded bottom outlet collar, a valve for closing said outlet comprising a body having a portion of its wall threaded so as to be screwed upward into said collar, the lower portion of the body affording an external pipe connection, a separate annulus inserted into said body, said annulus having a lower portion which is fixed in the upper portion of the body at a region below the zone of the screw joint, the annulus thence rising upward within said zone but free from the influence of possible distortion arising therein and carrying a valve seat considerably elevated above said mechanism chamber, a downwardly seating valve member, spring means beneath the valve member for drawing the same down upon the seat, and means in said mechanism chamber and below said valve member for raising the same to open the outlet, said means being unconnected with the valve member.

6. In a tank having a bottom outlet, a valve body secured in said outlet and having a lower portion affording an external pipe connection and containing a mechanism chamber within the walls that confine the discharging liquid when the valve is open, a valve seat in the body above said mechanism chamber, a valve member seating downwardly upon said seat, a stem depending from said valve member, a spring about said stem and acting thereon to draw the valve member down against said seat, and a fluid-pressure-operated bellows device in said mechanism chamber and below said stem for raising the valve member off the seat, said device being separate from the valve stem against which it is to act.

7. In a tank having a bottom outlet, a valve body secured in said outlet and having a lower portion affording an external pipe connection and containing a mechanism chamber within the walls that confine the discharging liquid when the valve is open, an annular member set into the upper portion of said body and carrying a valve seat, a valve member seating downwardly upon said seat, a stem depending from said valve member, a support likewise carried by said annular member, a spring abtument on said support, an expansion spring acting between said abutment and said stem to press the valve member down against the seat, and means in said mechanism chamber of the lower portion of the body for raising the valve member off the seat.

8. In a tank having a bottom outlet, a valve body secured in said outlet and provided with an upwardly facing valve seat, a downwardly seating valve member having a central opening and a piece tightly closing said opening from above, the construction affording a recess between the valve member and its closure piece, a stem depending from the valve member, a spring beneath the valve member acting downwardly upon said stem, means of universal articulation between the upper part of the valve stem and said recess, and operating means in the lower part of the valve body and having a thrust member separate from the valve stem adapted to raise the same and the valve member.

9. In a tank having a bottom outlet, a valve comprising a body secured in said outlet, a downwardly seating valve member, a removable bottom plate on said body, and a fluid-operated bellows device for raising said valve member off its seat, said device being mounted on said plate within the liquid confining walls of said body and being removable with said plate therewith.

10. In a tank having a bottom outlet, a valve comprising a body secured in said outlet, said body comprising an upper portion provided with a valve seat and with a lower portion outside the tank having a lateral outlet and a removable bottom plate, said plate having a fluid passage and means of connection with a fluid operating line, a valve disk cooperating with said seat, and fluid-operated means for raising the valve member off the seat comprising a bellows device mounted on and removable with said bottom plate and being in communication with the fluid passage thereof.

11. In a tank having a bottom outlet, a valve comprising a body secured in said outlet and provided with a valve seat and with a removable bottom member, and a fluid-operated bellows device beneath said valve for raising the same off the seat, said bellows device being within the liquid confining walls of said body and having one end clamped between said body and said removable bottom member.

12. In a tank having a bottom outlet, a valve comprising a body secured in said outlet and provided with a valve seat and with a removable bottom member, a fluid operated bellows device beneath said valve member for raising the same off its seat, said device comprising telescopic sections arranged one within the other and carried by said removable bottom member, an upstanding central guide secured to said bottom member, and a thrust member movable on said guide and connected with the inner section of said bellows device.

13. In a tank having a bottom outlet, a valve comprising a body secured in said outlet and provided with a valve seat, a fluid-operated bellows device in the lower part of said body beneath said valve member for raising the same off its seat, said device comprising telescopic sections arranged one within the other, and a stop in the body above the outer section of said device for limiting the upward movement thereof.

14. In a tank having a bottom outlet, a valve comprising a body secured in said outlet and provided with a valve seat, a fluid-operated bellows device in the lower part of said body beneath said valve member for raising the same off its seat, said device comprising telescopic sections arranged one within the other, a central guide rising from the lower portion of the valve body, a valve raising member movable on said guide and connected to the inner sections of said device, and cooperating stop means between said guide and said valve-raising member limiting the upward movement of said inner section.

15. In a tank having a bottom outlet, a valve comprising a body secured in said outlet and provided with a valve seat, a fluid-operated bellows device in the lower part of said body beneath said valve member for raising the same off its seat, said device comprising telescopic sections arranged one within the other, a central tubular guide rising from the lower portion of the valve body, a member slidable inside said guide, and a thrust head on the upper end of said member for unseating the valve member, said head being connected to the upper end of the inner section of said device.

16. In a tank having a bottom outlet, a valve comprising a body secured in said outlet, a downwardly seating valve member, a fluid-operated bellows device in the lower part of said body for raising said valve member off its seat, said body having a central opening in its bottom, and a removable plug closing said opening, the construction enabling the valve member to be unseated by thrusting upward through said opening.

17. In a tank having a bottom outlet, a valve comprising a body secured in said outlet, a downwardly seating valve member, a fluid-operated bellows device in the lower part of said body for raising said valve member off its seat, a tubular guide within the bellows device affording an opening into the body for insertion of a stick to raise the valve member, and a removable plug closing the lower end of said tubular guide.

18. In a tank having a bottom outlet, a body secured in said outlet, an annular part extending upward within the body and having a valve seat on its free upper portion, a downwardly seating valve member cooperating with said seat, a spring beneath the valve member for seating the same, means also below the valve member and within the liquid confining walls of the body for raising the valve member off said seat, and a screen secured to said annular part covering and enclosing said valve seat and valve member.

19. In a tank having a bottom outlet, a valve body secured in said outlet and comprising an upper portion provided with an annular valve seat and a lower portion providing a pipe connection, a downwardly closing valve member cooperating with said seat, a stem depending from the valve member, a spring cooperating with said stem to seat the valve member, a fluid-pressure actuated device in the lower part of said body contained within the walls thereof that confine the discharging liquid when the valve is open, and a fluid pressure line connected with an opening in one of said walls to admit actuating fluid.

ARTHUR L. BETTS.
PAUL S. SHIELD.